United States Patent [19]

Kaplan

[11] 4,447,071

[45] May 8, 1984

[54] EXTENSIBLE HITCH FOR TOWING VEHICLES

[75] Inventor: James W. Kaplan, Prairie Village, Kans.

[73] Assignee: Harlan Material Handling Corporation, Kansas City, Kans.

[21] Appl. No.: 369,487

[22] Filed: Apr. 19, 1982

[51] Int. Cl.³ .............................................. B60D 1/00
[52] U.S. Cl. ................................ 280/479 R; 280/482
[58] Field of Search ............... 280/479 R, 478 R, 482, 280/488, 490, 493, 498, 499, 491 R, 491 B, 491 D, 502, 511, 415 A, 415 B, 515, 478 A, 478 B, 478 R, 477; 172/677, 679

[56] References Cited

U.S. PATENT DOCUMENTS

| | | | |
|---|---|---|---|
| 1,422,189 | 7/1922 | Eckertz | 280/478 A |
| 3,126,210 | 3/1964 | Hill | 280/478 A |
| 3,279,819 | 10/1966 | Edmonds | 280/478 B |
| 3,404,901 | 10/1968 | Rau | 280/482 X |
| 4,007,945 | 2/1977 | Lasad et al. | 280/478 B |
| 4,114,921 | 9/1978 | Thorell et al. | 280/478 B |
| 4,240,647 | 12/1980 | Lewis | 280/482 |
| 4,368,899 | 1/1983 | Smalley et al. | 280/477 |

FOREIGN PATENT DOCUMENTS 460956 1/1951 Italy ............................... 280/478 B Primary Examiner—Joseph F. Peters, Jr.
Assistant Examiner—Mitchell J. Hill
Attorney, Agent, or Firm—Schmidt, Johnson, Hovey & Williams

[57] ABSTRACT

An attachment for tractors to permit connection with trailer couplings has a pair of plates, the outer of which carries a latch provided with a spring-loaded latching pin for releasable joinder with the couplings. The outer plate is reciprocated toward and away from the tractor by the piston shaft of a hydraulic cylinder, and a pair of rods guide the outer plate during reciprocation. After latching of the pin to the coupling the shaft is withdrawn to place the plates next adjacent each other, and before movement of the two vehicles, the plates are interconnected by a spring-loaded locking bolt carried by the inner plate.

5 Claims, 7 Drawing Figures

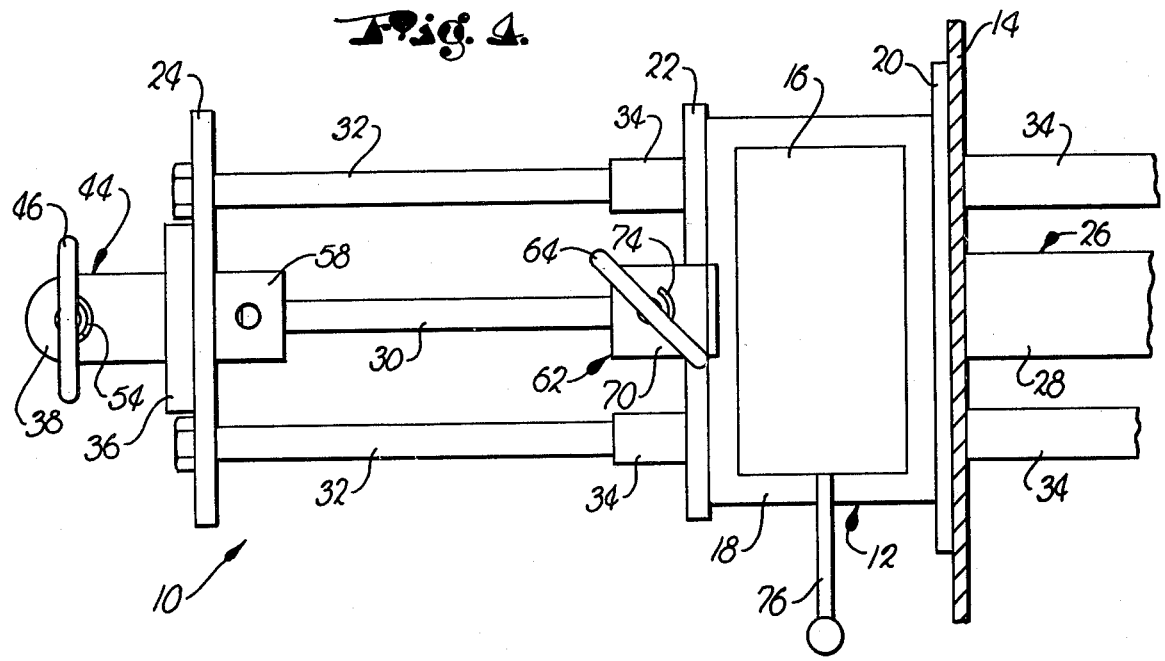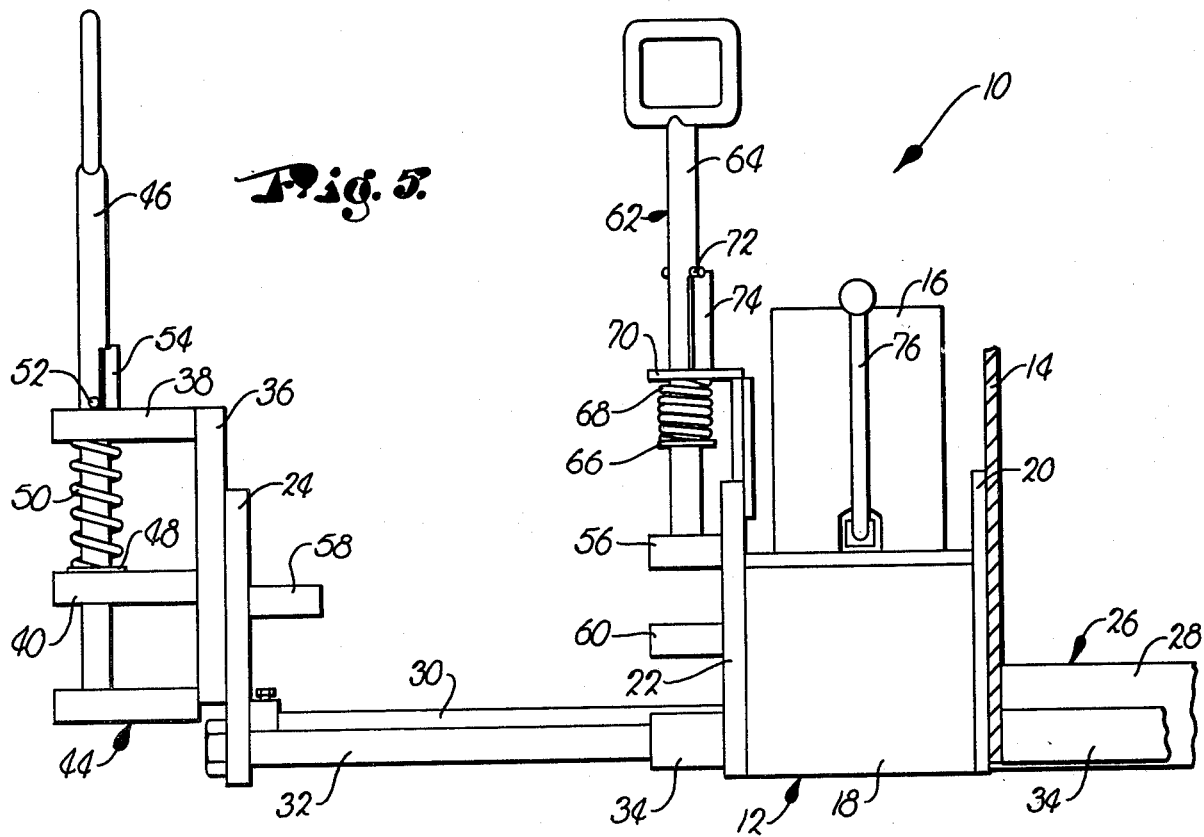

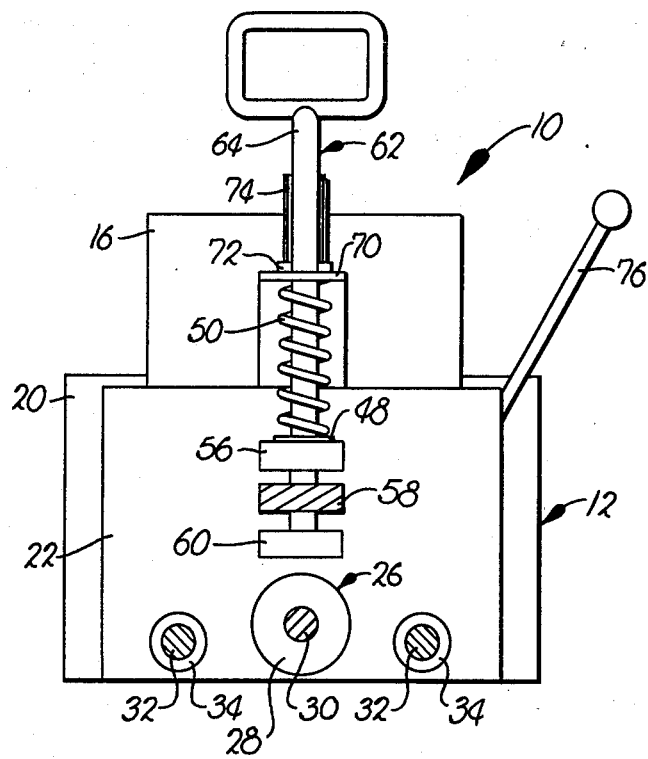
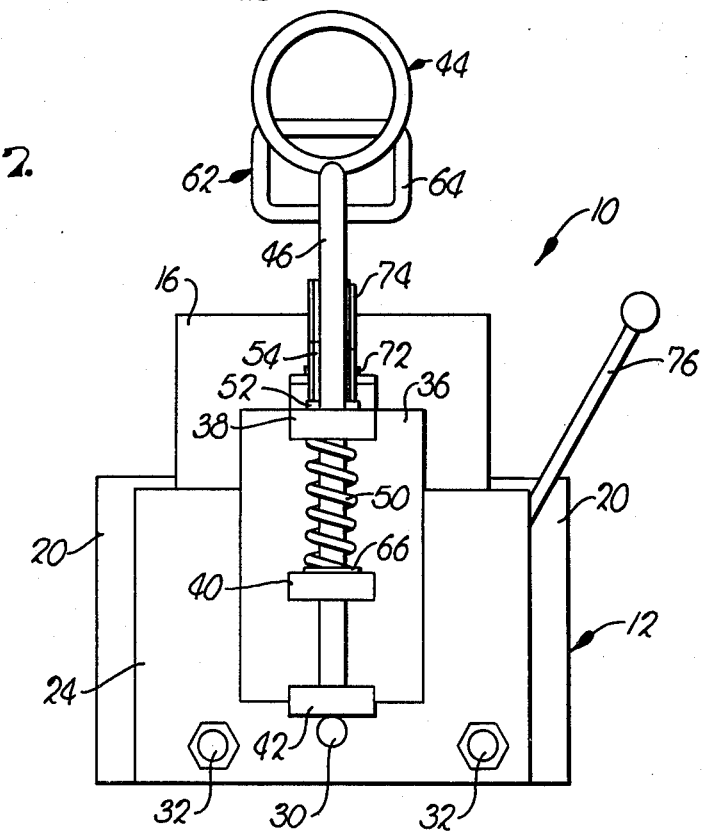

EXTENSIBLE HITCH FOR TOWING VEHICLES

The task of hitching tractors, farm, industrial or otherwise, with trailers and other mobile units continues to be a somewhat aggravating problems. The tractor operator must first attempt to align the drawbar or other push-pull connecting structure with the trailer tongue or other coupling, and move the tractor into proper close proximity to the trailer. The difficulties are greatly enhanced when the parts on the tractor and/or trailer to be hitched together are out of the line of sight of the operator on the tractor. He must then get off the tractor and attempt to insert the latching pin of the hitch.

If on the first try the openings for receiving the pin are not aligned, the operator must then get back on the tractor and try once again to place the tractor into proper position. Such repeated on and off the tractor and manuevering of the tractor several times becomes quite exasperating and time-consuming, especially when connection and disconnection becomes necessary many, many times during each working day as, for example, in factories, warehouses, plants and other industrial and commercial facilities. As a consequence, it is not uncommon for the operation to require two workmen, the operator of the tractor and an assistant off the tractor who signals to the operator and then inserts the hitch pin.

Accordingly, I have solved the problems by the provision of an attachment which may be easily mounted on either the front or the back of any tractor or other power unit capable of pushing or pulling trailers or other mobile vehicles. An extensible, actuator, such as a fluid pressure piston and cylinder assembly, is carried by a support for horizontal, reciprocable movement of the piston shaft inwardly and outwardly toward and away from the tractor.

An upright outer plate connected to the outer end of the shaft for reciprocation therewith, has a latch on its outer face in the form of spaced, perforated lugs, together with a spring-loaded latching pin for releasable connection with the tongue of the vehicle to be moved. A pair of rods secured to the plate and reciprocably carried by the support serves as guides for the plate.

A spring-loaded locking bolt is provided on the support, and an upright inner plate forms a part of the support. Additional perforated lugs on the surfaces of the plates which face each other receive the locking bolt when the shaft is withdrawn to prevent separation of the plates during pushing or pulling of the mobile vehicle by the power vehicle.

In the drawings:

FIG. 4 is a view similar to FIG. 2 showing the hitch in its extended position;

FIG. 5 is a view similar to FIG. 3 showing the hitch in its extended position;

FIG. 6 is a cross-sectional view taken on line 6—6 of FIG. 3; and

FIG. 7 is an end view thereof.

Figure 1:
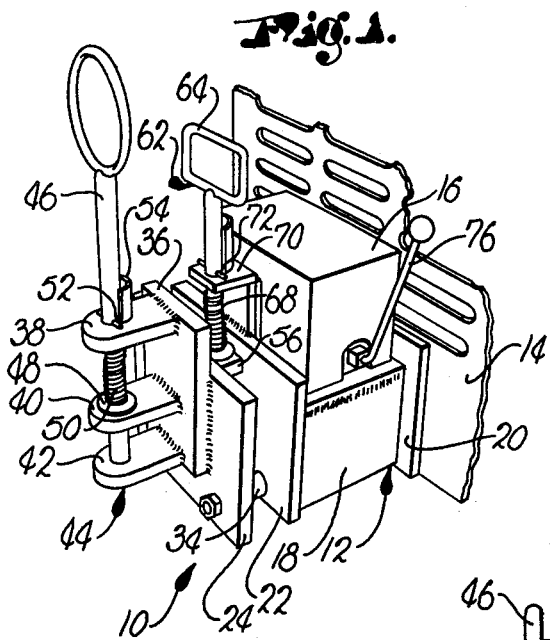
FIG. 1 is a perspective view of an extensible hitch for towing vehicles made in accordance with my present invention.
Figure 2:
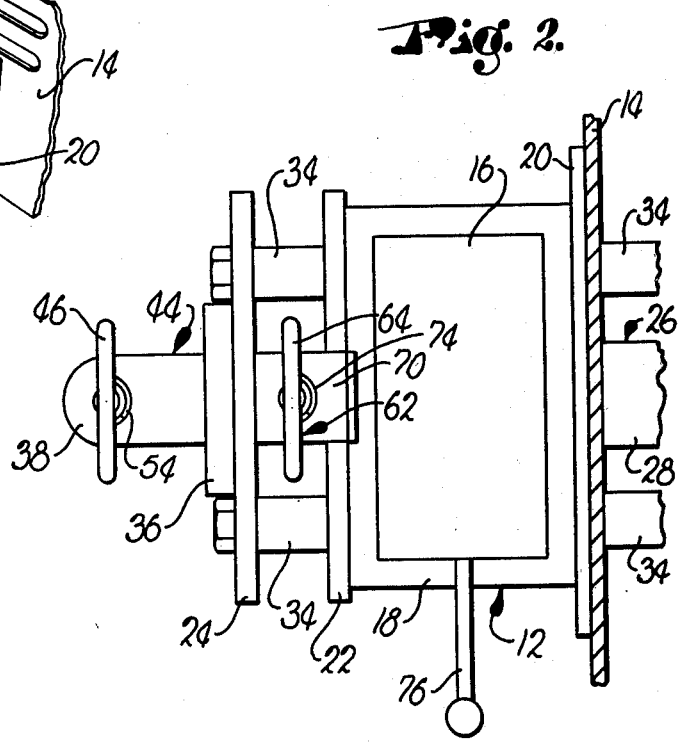
FIG. 2 is an enlarged, plan view of the hitch shown in its retracted position.
Figure 3:
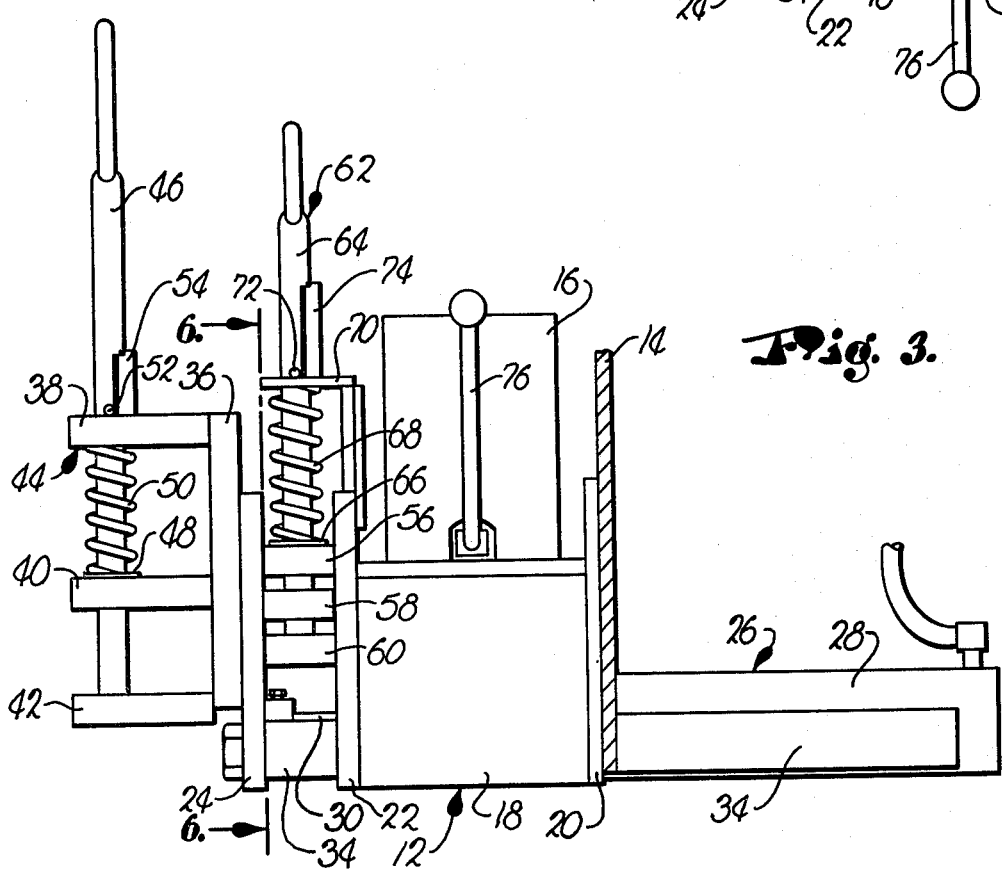
FIG. 3 is a side elevational view thereof in the retracted position.

The extensible hitch illustrated in the drawings is broadly designated by the numeral 10 and includes a support 12 adapted for attachment to a tractor or other vehicle having power means for effecting its fore and aft movement, a portion only of such vehicle being illustrated and designated by the numeral 14.

The support 12 includes a housing 16 resting on and secured to an underlying, U-shaped base 18 that is, in turn, provided with a rear wall 20 which may be bolted or otherwise releasably attached to the portion 14 of the tractor.

The hitch 10, carried by the support 12, includes a first inner plate 22 and a second outer plate 24 the former of which is rigidly attached to the base 18 in any suitable manner.

Power means for extending the second outer plate 24 outwardly away from the first inner plate 22 and for retracting the outer plate 24 is in the nature of a fluid pressure piston and cylinder assembly 26 which includes a double acting hydraulic cylinder 28 having a horizontally reciprocable piston shaft 30 rigidly connected at its outermost end with the outer plate 24 intermediate the ends of the latter and adjacent the lower longitudinal edge of the outer plate 24. The cylinder 28, which may be supported by the tractor in any suitable manner, is located behind the wall 20, and its shaft 30 extends freely through the wall 20 as well as through the inner plate 22.

A pair of rods 32 for guiding the outer plate 24 during its reciprocation, are secured at their outer ends to the inner plate 22 adjacent the outer corners of the latter and the shaft 30 is located between the rods 32 in parallelism with the latter. The rods 32 pass freely through the inner plate 22 and the wall 20, extending, when the outer plate 24 is retracted, into corresponding tubular casings 34 suitably supported by the framework of the tractor.

An upstanding bracket 36 is rigidly fixed to the outer face of the outer plate 24 intermediate the ends of the latter, the bracket 36 carrying three forwardly extending, vertically spaced perforated lugs 38, 40 and 42 forming a part of a latch broadly designated by the numeral 44. The latch 44 includes additionally a spring-loaded latching pin 46 that is shiftable vertically through the perforations within the lugs 38-42. The pin 46 has a washer 48 rigid thereto between the lugs 38 and 40, and a spring 50 is coiled about the pin 46 between the washer 48 and the lug 38. A cross pin 52 passes through the pin 46 above the lug 38, and an arcuate, upstanding catch 54, secured to the upper face of the lug 38, partially embraces the pin 46.

Three horizontal, perforated lugs 56, 58 and 60 are also located between the inner and outer plates 22 and 24, respectively the lugs 56 and 60 being rigid to the inner plate 22 and the intermediate lug 58 being rigid to the outer plate 24.

The lugs 56-60 form a part of a releasable lock broadly designated by the numeral 62 which includes additionally, a vertically shiftable locking bolt 64 received by the perforations of the lugs 56-60. A washer 66 rigid to the bolt 64 is located above the lug 56, and a spring 68 is coiled about the bolt 64 between the washer 66 and an L-shaped bracket 70 carried by the front face of the housing 16.

The bolt 64 passes freely through the horizontal leg of the bracket 70 and above the latter there is provided a cross pin 72 which extends through the bolt 64. An upstanding catch 74 rigid to the bracket 70 is of arcuate formation and partially surrounds the bolt 64.

The hydraulic circuit for the assembly 26 is operably coupled with the hydraulic system of the tractor and includes the normal valving for controlling reciprocable movement of the shaft 30, such valving being disposed within the housing 16 and manually controlled by an operating lever 76.

OPERATION

When the tractor upon which the hitch 10 has been mounted is to be placed in use for the purpose of towing or pushing a mobile unit, whether the hitch 10 is attached to the front or to the back of the tractor, the operator on the tractor simply drives the tractor to a position where the latch 44 is located in general proximity to the towing tongue or other coupling of the vehicle to which the hitch 10 is to be attached. The outer plate 24 should be previously extended away from the inner plate 22 by operation of the lever 76 such as to cause the assembly 26 to shift the outer plate 24 away from the inner plate 22 as the rod shaft 30 and the rods 32 are extended in unison.

The tractor operator may then get off the tractor and raise the rotatable pin 46 against the action of the spring 50 to a position placing the cross pin 52 above the catch 54. The pin 46 may then be rotated to a position which places the pin 52 above the catch 54, thereby holding the pin 46 in its uppermost position at which time the pin 46 is located with its lowermost end adjacent the lower face of the lug 40, retracted from the lug 42.

The operator need merely place the pin receiving hole of the tongue of the mobile unit into alignment with the pin 46, it being understood that such tongue is normally swingable within a horizontal plane. Then the pin 46 is released by rotation such as to permit the cross pin 52 to descend under the action of the spring 50 to a point where the cross pin 52 rests upon the upper face of the lug 38. This causes the pin 46 to interconnect the lugs 40 and 42 with the tongue between the lugs 40 and 42, connected with the pin 46.

The next step on the part of the operator is to actuate the lever 76 such as to withdraw the shaft 30 and the rods 32, causing the inner and outer plates 22 and 24 respectively, to move into closer relationship, causing corresponding movement by the tongued unit and/or the tractor. At this juncture, the operator rotates the bolt 64 of the lock 62 so as to release the cross pin 72 from the catch 74 and, at that time, the spring 68 will shift the bolt 64 downwardly until the washer 66 comes into contact with the upper face of the lug 56. At that time, the perforations of the lugs 56, 58 and 60 will be vertically aligned such as to cause them to be interlocked by the bolt 64. Following such step, the tractor may be used to pull or push the trailer or other mobile unit with the forces being off the assembly 26 and absorbed entirely by the lock 62.

It can now be understood and appreciated that the tasks heretofore made necessary are appreciably simplified, avoiding the need for an assistant to the tractor operator as above explained. Important also is the fact that the hitch 10 may be located on the tractor out of the line of sight of the tractor operator because he need manipulate the tractor only to the extent of placing the latch 44 in an approximate position for permitting connection with the tongue or other coupling. The hitch 10 is universally adaptable for use with virtually all types of tractors and with all types of vehicles to be pushed or pulled thereby. The hitch 10 is especially advantageous in association with tractors used in factories, warehouses and the like wherein mobile materials handling equipment must be moved from one place to another continuously throughout the working day, requiring multiplicity of connections and disconnections now made possible easily and quickly as distinguished from all conventional hitches with which I am aware.

My invention is especially adaptable for use in the aircraft industry, both military and commercial, in and around airports, hangers and the like where tractors are extensively used daily for movement of luggage and cargo carriers and other equipment.

I claim:

1. An extensible hitch for releasably attaching a vehicle having power means for effecting fore and aft movement thereof to a mobile unit to be moved thereby and provided with a coupling, said hitch comprising:
   a support adapted for attachment to said vehicle;
   a fluid piston and cylinder assembly carried by the support and provided with a reciprocable piston shaft;
   a latch adapted for releasable connection with said coupling and secured to said shaft for reciprocation therewith toward and away from said coupling during use of the hitch to attach the unit to the vehicle;
   a releasable lock mounted on said support for holding the latch adjacent the support after the latch is connected to the coupling;
   a first plate secured to the support; and
   a second plate secured to the shaft,
   said latch having a spring loaded latching pin on the second plate.

2. An extensible hitch for releasably attaching a vehicle having power means for effecting fore and aft movement thereof to a mobile unit to be moved thereby and provided with a coupling, said hitch comprising:
   a support adapted for attachment to said vehicle;
   a fluid piston and cylinder assembly carried by the support and provided with a reciprocable piston shaft;
   a latch adapted for releasable connection with said coupling and secured to said shaft for reciprocation therewith toward and away from said coupling during use of the hitch to attach the unit to the vehicle;
   a releasable lock mounted on said support for holding the latch adjacent the support after the latch is connected to the coupling;
   a first plate secured to the support; and
   a second plate secured to the shaft,
   said lock having a spring loaded locking bolt on the first plate.

3. An extensible hitch for releasably attaching a vehicle having power means for effecting fore and aft movement thereof to a mobile unit to be moved thereby and provided with a coupling, said hitch comprising:
   a support adapted for attachment to said vehicle;
   a fluid piston and cylinder assembly carried by the support and provided with a reciprocable piston shaft;
   a latch adapted for releasable connection with said coupling and secured to said shaft for reciprocation therewith toward and away from said coupling during use of the hitch to attach the unit to the vehicle;

a releasable lock mounted on said support for holding the latch adjacent the support after the latch is connected to the coupling;

a first plate secured to the support; and a second plate secured to the shaft, said latch having a spring loaded latching pin on the second plate, said lock having a spring loaded locking bolt on the first plate.

4. The invention of claim 3; and a pair of horizontally spaced guide rods joined with the second plate and extending slidably through the first plate.

5. The invention of claim 4, said shaft extending slidably through the first plate and being in spaced parallelism with said rods therebetween.

* * * * *